United States Patent [19]

Chen

[11] Patent Number: 5,218,287
[45] Date of Patent: Jun. 8, 1993

[54] LEAD BATTERY ASSEMBLY ADAPTED TO BE CHARGED BY A CHARGER FOR A NICKEL-CADMIUM BATTERY

[75] Inventor: Stephen Chen, Chang Hua, Taiwan
[73] Assignee: E Lead Electronic Co., Ltd., Taiwan
[21] Appl. No.: 805,751
[22] Filed: Dec. 12, 1991
[51] Int. Cl.⁵ .................................................. H02J 7/10
[52] U.S. Cl. ............................................ 320/39; 320/2; 320/22
[58] Field of Search ..................... 320/21, 22, 23, 24, 320/31, 32, 39, 40

[56] References Cited

U.S. PATENT DOCUMENTS 4,686,443  8/1987  Steblay ........................... 320/39 X

FOREIGN PATENT DOCUMENTS 2364186  7/1974  Fed. Rep. of Germany ........ 320/39
0173980  10/1984  Japan ..................................... 320/39
0003874  1/1985  Japan ..................................... 320/22
0119538  5/1990  Japan ..................................... 320/39

Primary Examiner—Steven L. Stephan
Assistant Examiner—Kristine L. Peckman
Attorney, Agent, or Firm—Browdy and Neimark

[57] ABSTRACT

A lead battery assembly including a lead battery, a voltage-detecting circuit used to detect the voltage of the lead battery and an automatic voltage-charging circuit, these circuits being connected to the lead battery and contained together with the lead battery in a housing, a connecting base being electrically engaged with the above circuits wherein the connecting base is adapted to engage with a charger for a nickel-cadmium battery whereby when the detecting circuit detects that the voltage of the lead battery reaches a certain value, it will send a signal to the voltage-changing circuit to slowly lower the voltage thereof and after the total voltage of the lead battery and the voltage-changing circuit change from an increasing state to a decreasing state, the charger will sense the decreasing voltage and stop charging the lead battery so that the lead battery is permitted to be charged by a charger for a nickel-cadmium battery.

Another embodiment uses two connecting bases, one for charging the lead battery and the other for attachment and supply of power to an electrical appliance. Another embodiment uses an adapter between the base and the charger which adapter houses the detecting circuit and the voltage-changing circuit.

9 Claims, 7 Drawing Sheets

LEAD BATTERY ASSEMBLY ADAPTED TO BE CHARGED BY A CHARGER FOR A NICKEL-CADMIUM BATTERY

BACKGROUND OF THE INVENTION

A rechargeable battery has become more and more important nowadays. In general a mercury cell has small volume with small capacity. Such a cell cannot be recharged for continuous use. A nickel/cadmium battery also has small volume while being easily rechargeable with longer usable life. However, such a battery is expensive and cannot be so conveniently carried. Moreover, although such a battery has greater capacity than a general cell, it is still insufficient for a great energy-consuming appliance or for long term use and therefore the exhausted battery needs to be replaced frequently causing inconvenience.

Figure 1:
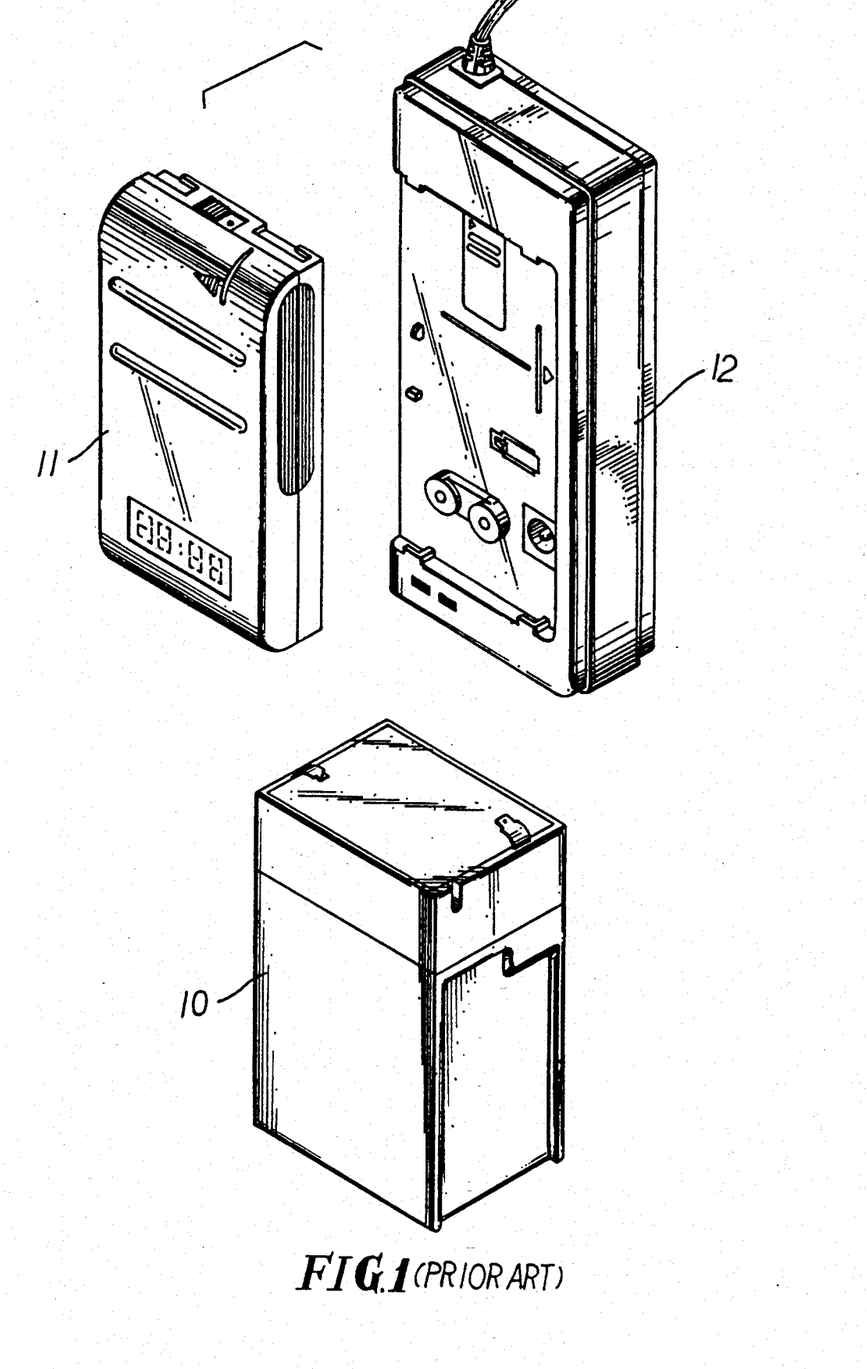
FIG. 1 shows a charger for a nickel/cadmium battery.

Therefore, a lead battery is used to replace the nickel/cadmium battery. The lead battery has a capacity several times that of a nickel/cadmium battery. However, the feature of the saturated voltage of the lead battery is different from that of a nickel/cadmium battery in that the saturated voltage of the lead battery will not gradually lower like that of a nickel/cadmium battery so that a lead battery 10 cannot be properly charged by a charger 12 used for a nickel/cadmium battery 11 as shown in FIG. 1 because the lead battery cannot engage with the charger 12 and the saturated voltage of the lead battery cannot be properly controlled. The lead battery might be taken off when not yet saturated or the lead battery might be over-charged and so heated as to cause damage. Therefore, another charger for a lead battery is required and this is money-wasting and troublesome during travel.

Moreover, the saturated voltage of a nickel/cadmium battery is not constant when charged and greatly varies due to the effect of battery capacity, remaining energy, charging current, temperature, etc. Therefore, we cannot judge whether such a battery is saturated just by its voltage reading. As a result, the manufacturers add a certain kind of "prescription" into the material of the nickel/cadmium battery when manufacturing it so that when the temperature rises, the battery voltage goes down. Therefore, when the saturation is not yet reached, most of the electric power is converted into the potential energy of the battery and thermal energy is hardly produced. While, when the battery is saturated, the electric power cannot be further converted into potential energy and becomes thermal energy to raise the temperature of the battery. At this time, the "prescription" takes effect to lower the battery voltage. The charger senses the gradually lowered voltage and judges that the battery is saturated to stop charging it.

Since the lead battery lacks the above feature that the voltage lowers when saturated and heated, the lead battery is not suitable to be charged by a charger for a nickel/cadmium battery. It is therefore attempted by the applicant to make the lead battery also possess such feature so as to be able to be suitably charged by a charger for the nickel/cadmium battery.

SUMMARY OF THE INVENTION

It is a primary object of this invention to provide a lead battery assembly which is adapted to be easily carried and suitably charged by a charger for a nickel/cadmium battery.

According to the above object, the present invention includes a lead battery and an automatic voltage-changing circuit connected thereto in series and a detection circuit connected thereto in parallel for detecting the voltage of the lead battery. The detecting circuit can control the voltage-changing circuit to slowly lower the voltage thereof. The present invention further includes a housing containing the lead battery and a connecting base for electrically engaging with a charger used with a nickel/cadmium battery, whereby the detecting circuit sends a signal to the voltage-changing circuit to lower the voltage thereof when the battery voltage reaches a certain value until the total voltage of the voltages of the lead battery and voltage-changing circuit changes from an increasing state to a decreasing state. At this time, the charger senses the slowly lowered voltage and stops charging the lead battery.

BRIEF DESCRIPTION OF THE DRAWINGS

FIG. 2A is a circuit diagram of a first embodiment of this invention.

DETAILED DESCRIPTION OF THE PREFERRED EMBODIMENTS

Figure 2:
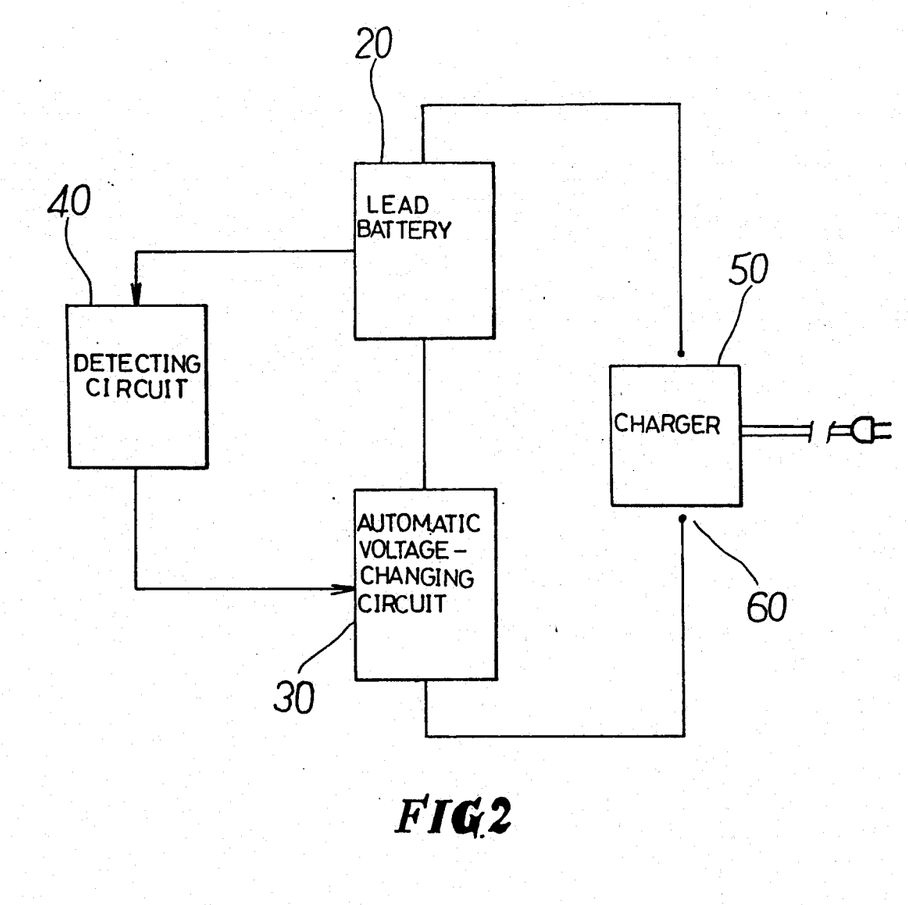
FIG. 2 is a block diagram of this invention.

As shown in FIGS. 2 and 2A, the present invention includes a lead battery 20 and an automatic voltage-changing circuit 30 connected thereto in series and a detecting circuit 40 connected thereto in parallel for detecting the voltage of the lead battery 20. The detecting circuit 40 can control the voltage-changing circuit 30 to slowly lower the voltage thereof. The present invention further includes a connecting base 60 for electrically connecting with a charger 50 used with a nickel/cadmium battery, whereby the connecting base 60 can engage with the charger 50 to charge the lead battery 20. Although the charging saturated voltage of the lead battery 20 is not constant, it always falls within a range. For example, 6 V lead battery 20 has a saturated voltage within 8.4 V-8.8 V when charged by a 1.3 A charger, while the voltage of the voltage-changing circuit 30 is set to be a constant value (0.7 V or higher or lower) before receiving the signal from the detecting circuit 40. The voltage of the detecting circuit 40 can be set to be slightly lower than the saturated voltage (about 8.3 V) of the lead battery 20 whereby when the lead battery 20 is charged with its voltage reaching 8.3 V, the detecting circuit 40 will automatically send a signal to the voltage-changing circuit 30 for slowly lowering the voltage thereof.

At this time, the voltage of the lead battery 20 still increases so that the charger 50 will sense an increasing total voltage (the sum of lead battery voltage and voltage-changing circuit voltage). As long as the voltage of the voltage-changing circuit 30 goes down slowly enough, when the battery is charged to saturation, most of the electric energy will change into thermal energy. Under such circumstances, the voltage of the lead battery will no longer increase while the voltage of the voltage-changing circuit 30 still goes down so that the charger 50 will sense a lowered total voltage and thus judge that the lead battery is saturated and stop charging it.

Figure 3:
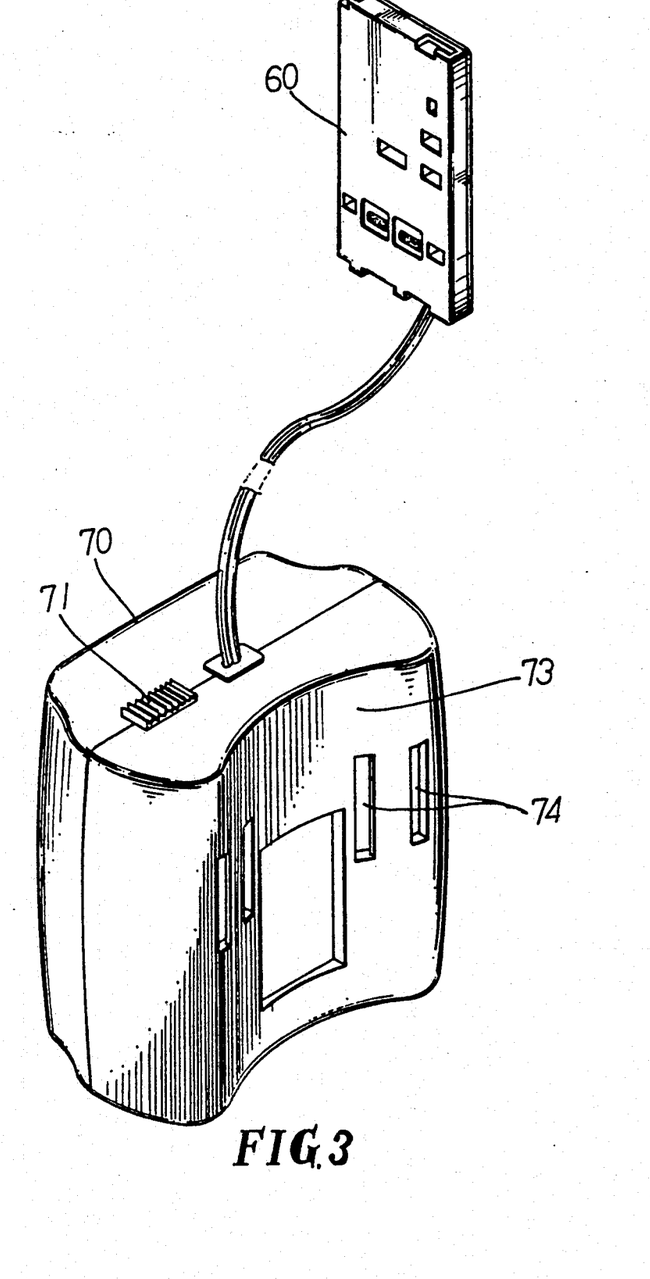
FIG. 3 is a perspective view of the first embodiment thereof.
Figure 4:
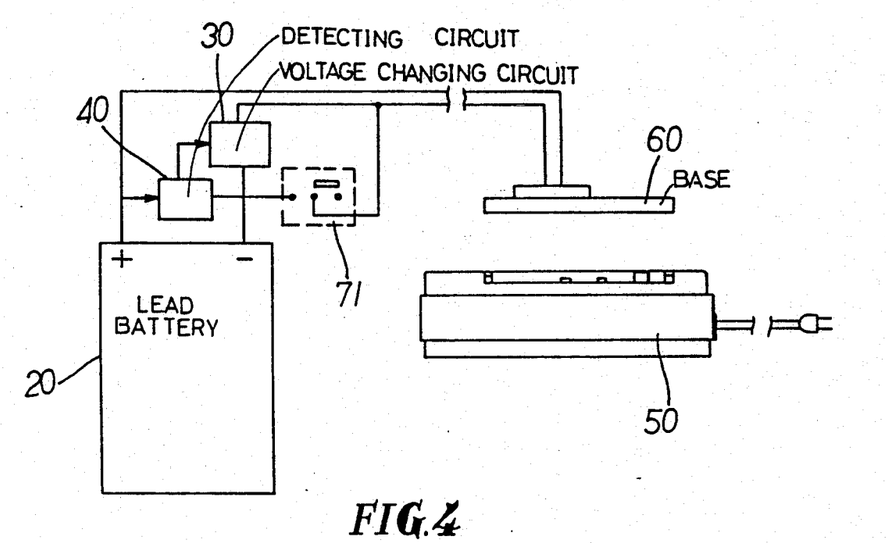
FIG. 4 is a block diagram thereof, showing one state thereof.
Figure 5:
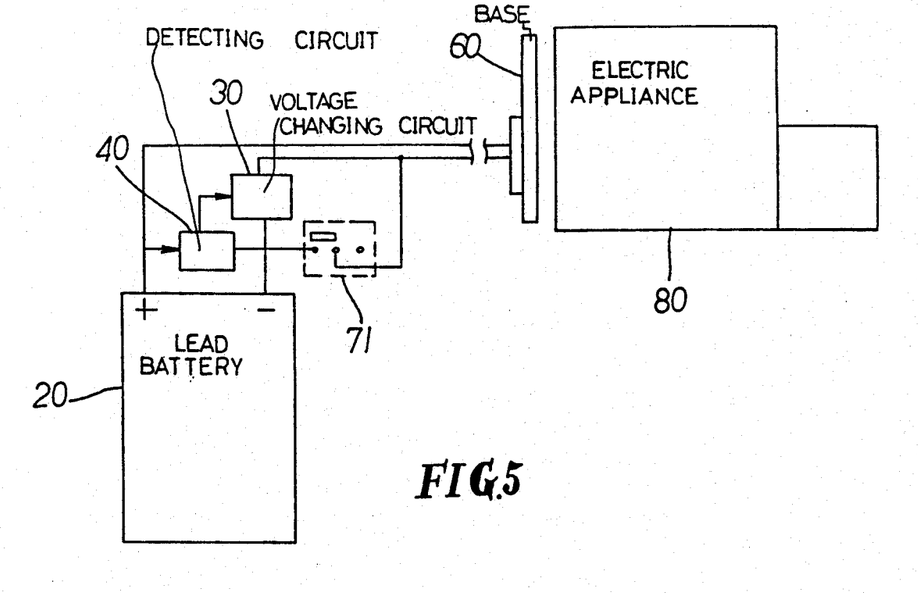
FIG. 5 is still a block diagram thereof, showing another state thereof.

When applied, the lead battery 20 and the above circuits 30, 40 are contained in a housing 70 having an extending connecting base 60 which is adapted to engage with the charger 50 or an electric appliance 80 as shown in FIGS. 3 and 4. A control switch 71 is disposed on the housing 70 between the lead battery 20 and the connecting base 60 whereby when the switch 71 is switched right (as shown in FIG. 4), the connecting base 60 is connected to the charger 50, permitting the charger 50 to cooperate with the circuits 30, 40 for charging the lead battery into a saturated state and then automatically stop charging it. Moreover, when the switch 71 is switched left, the engaging base 60 is connected to the electric appliance 80 (as shown in FIG. 5), enabling the lead battery 20 to directly supply the electric appliance 80 with power without being controlled by the circuits 30, 40. Therefore, the lead battery 20 can provide power for the electric appliance or alternatively be charged by the charger when the voltage thereof is lowered during switching.

Figure 6:
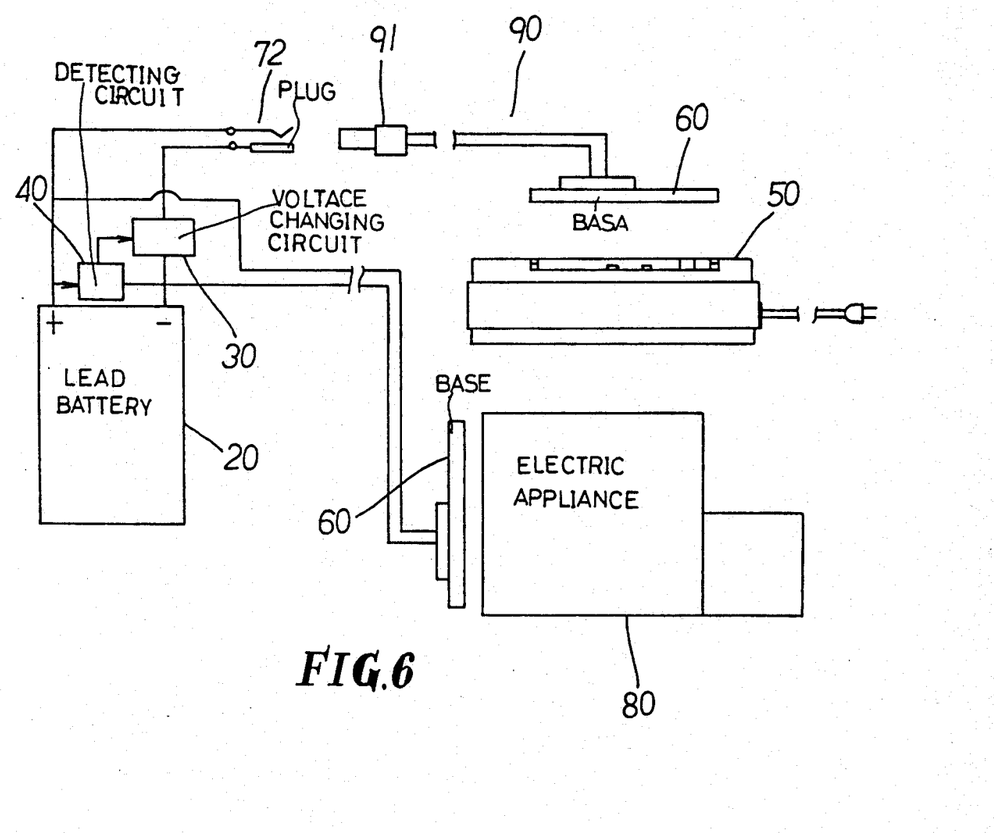
FIG. 6 is a block diagram of a second embodiment of this invention.

As shown in FIG. 6, no switch 71 is disposed on the housing 70 while each electrode of the lead battery 20 is connected with a connecting base 60. A socket 72 is disposed on the housing 70 between the two circuits 30, 40. A cooperative wire assembly 90 having two connecting bases 60 at its two ends and a plug 91 is further disposed, whereby when the lead battery is to be connected with an electric appliance 80, the wire assembly 90 can be removed and the connecting base 60 can be directly connected with the appliance 80 and supply power therefor. When the battery is to be charged, the battery can be detached from the appliance and the plug 91 can be associated with the socket 72 and the connecting base 60 can be engaged with the charger 50.

Figure 7:
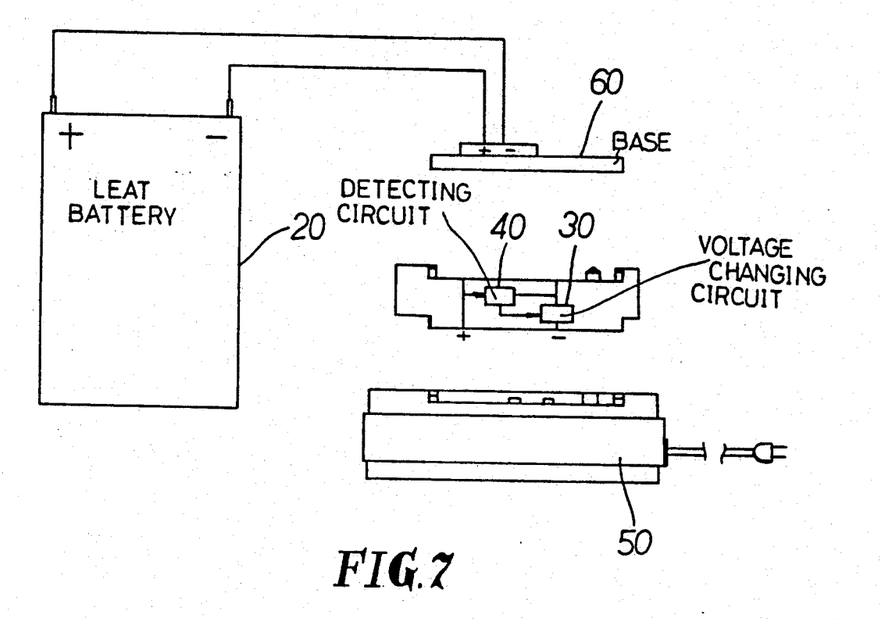
FIG. 7 is a block diagram of a third embodiment of this invention, showing a state thereof.
Figure 8:
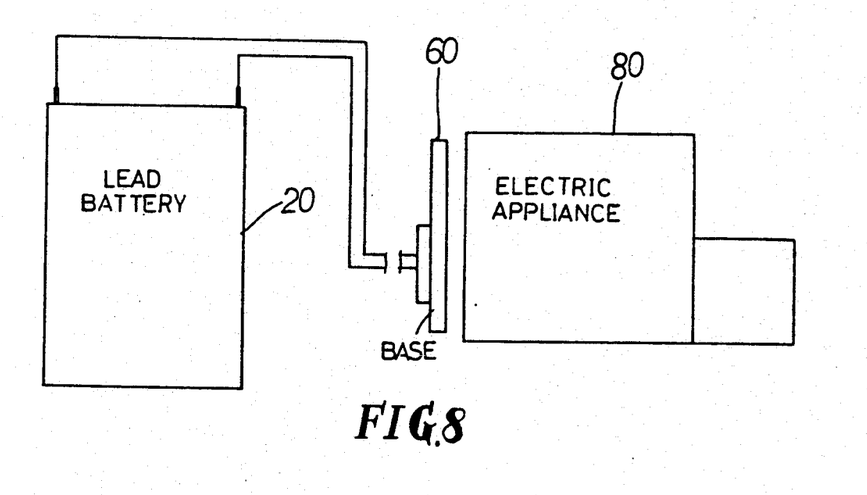
FIG. 8 is still a block diagram thereof, showing another state thereof.

As shown in FIGS. 7 and 8, the circuits 30, 40 can be alternatively connected with an adaptor having engaging channels and engaging bases. The housing 70 is provided with a connecting base 60 for connecting with the lead battery 20. The adaptor can electrically engage with the connecting base 60 and the charger 50 so that the adaptor can be optionally used, whereby when charged, the adaptor with the circuits 30, 40 are connected between the connecting base 60 and the charger 50 (as shown in FIG. 7), while when the battery is to supply power for the electric appliance 80 (as shown in FIG. 8), the adaptor with the circuits 30, 40 is removed.

As shown in FIG. 3, the housing 70 can be formed with a curved surface 73 on its one side and several holes 74 can be formed on the curved surface 73 for a rope or a belt to extend therethrough for easy carrying.

What is claimed is:

1. An assembly for charging a lead battery with a charger for a nickel-cadmium battery comprising:
    a charger for a nickel-cadmium battery;
    a lead battery to be charged and an automatic voltage-changing circuit connected in series with said charger;
    a detecting circuit for detecting the voltage of said lead battery connected in parallel with said charger, said lead battery and said voltage-changing circuit;
    said detecting circuit controlling said voltage-changing circuit to slowly lower the voltage of the voltage-changing circuit;
    a connecting base engageable with said charger and an electric appliance;
    a housing containing said lead battery, said voltage-changing circuit and said detecting circuit;
    said connecting base extendable from said housing;
    a control switch connected between said lead battery and said connecting base having first and second paths wherein said first path connects said lead battery to said charger through said connecting base and said second path connects said lead battery to said electrical appliance through said connecting base;
    whereby said battery is charged through said first path and said battery supplies power to said electrical appliance through said second path.

2. The assembly in accordance with claim 1 wherein said control switch is located on said housing.

3. The assembly in accordance with claim 1 wherein said housing is formed with a curved surface on one side of said housing and a plurality of holes formed in said curved surface for attachment to a belt to extend therethrough.

4. The assembly in accordance with claim 1 wherein said connecting base is extendable on an electrical cord from said housing.

5. An assembly for charging a lead battery with a charger for a nickel-cadmium battery comprising:
    a charger for a nickel-cadmium battery;
    a lead battery to be charged and an automatic voltage-changing circuit connected in series with said charger;
    a detecting circuit for detecting the voltage of said lead battery connected in parallel with said charger, said lead battery and said voltage-changing circuit;
    said detecting circuit controlling said voltage-changing circuit to slowly lower the voltage of the voltage-changing circuit;
    a first connecting base engageable with said charger;
    a housing containing said lead battery, said voltage-changing circuit and said detecting circuit;
    said first connecting base extendable from said housing;
    a second connecting base engageable with an electric appliance and connected in a direct electrical path to said lead battery;
    whereby said battery is charged through said first connecting base and said battery supplies power to said electrical appliance through said second connecting base.

6. The assembly in accordance with claim 5 wherein said first and said second connecting bases are extendable on an electric cord from said housing.

7. An assembly for charging a lead battery with a charger for a nickel-cadmium battery comprising:
    a lead battery;
    a connecting base connected to said lead battery;
    a charger for a nickel-cadmium battery;
    a separate housing having a first portion shaped for attachment to said connecting base and a second portion shaped for attachment to said charger;
    an automatic voltage-changing circuit and a detecting circuit enclosed in said housing;

said automatic voltage-changing circuit connected in a path in series with said lead battery;

said detecting circuit for detecting the voltage of said lead battery connected in a path in parallel with said charger, said lead battery and said voltage-changing circuit;

said detecting circuit controlling said voltage-changing circuit to slowly lower the voltage of the voltage-changing circuit;

said connecting base having a portion shaped for attachment to said separate housing and to an electrical appliance.

8. The assembly in accordance with claim 7 wherein said portion shaped for attachment to said separate housing and to said electrical appliance are the same portion.

9. The assembly in accordance with claim 7 wherein said connecting base is extendable on an electric cord from said lead battery.

* * * * *